Dec. 22, 1959 — E. C. FILSTRUP — 2,918,312
INSULATED COUPLINGS FOR HIGH PRESSURE FLUID LINES
Filed May 26, 1953 — 2 Sheets-Sheet 1

EDWARD C. FILSTRUP.
INVENTOR.

BY Eugene C. Knoblock
ATTORNEY.

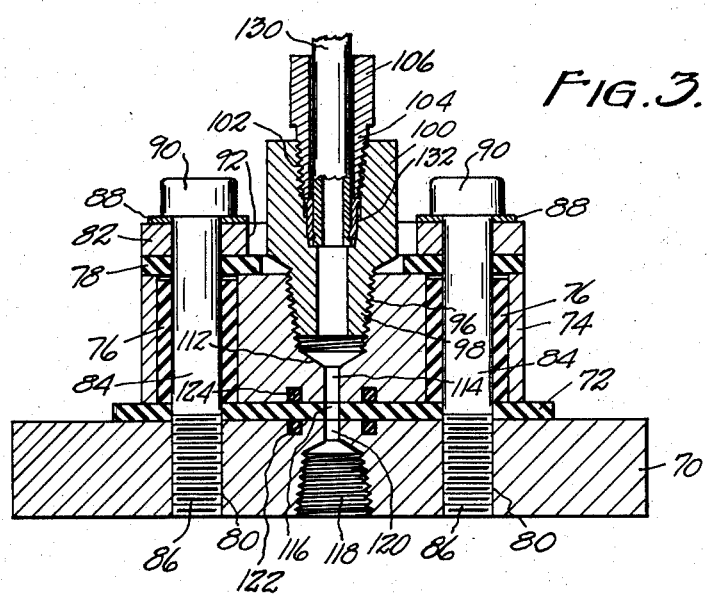
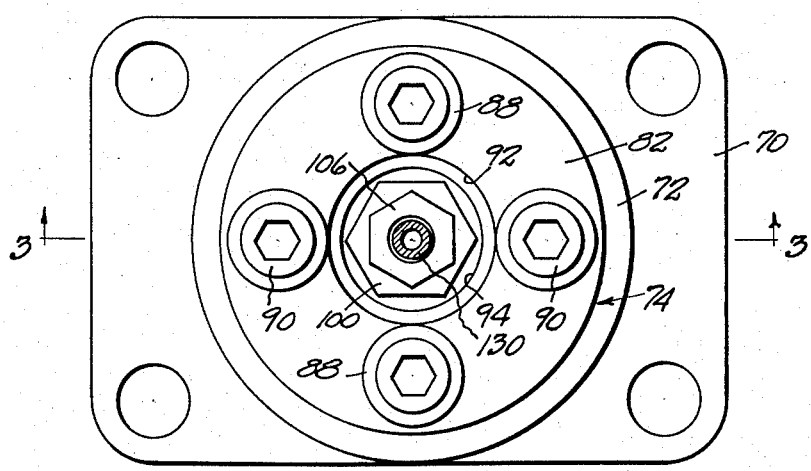

United States Patent Office 2,918,312
Patented Dec. 22, 1959

2,918,312

INSULATED COUPLINGS FOR HIGH PRESSURE FLUID LINES

Edward C. Filstrup, St. Joseph, Mich., assignor, by mesne assignments, to Olin Mathieson Chemical Corporation, a corporation of Virginia Application May 26, 1953, Serial No. 357,453

4 Claims. (Cl. 285—50)

This invention relates to improvements in insulated couplings for high pressure fluid lines.

In the use of pneumatic equipment and other types of fluid pressure operated equipment, and particularly in the use of portable equipment of this character, it is frequently necessary to provide a long line or conduit leading from a compressor to the portable tool. Such equipment is commonly used in locations in which electrical equipment is also used, and in which electrical leads or conduits are located. The atmospheres of such locations commonly are dangerous so that it is desirable to avoid the occurrence of sparks and short circuits.

One location at which such conditions exist is in a coal mine in which high pressure air-operated coal breakers of the type illustrated in Armstrong and Filstrup Patent No. 2,527,291, dated October 24, 1950, are employed to break down the coal from the working face of the mine. Devices of this character operate at high pressures in the range between 5,000 pounds per square inch and 15,000 pounds per square inch. The air compressors for such devices are commonly located at a position remote from the working face of the mine, and long lines extend from those compressors to the working face. Under such conditions it is highly desirable to electrically insulate the various sections making up the long conduit, one from another, and also it is desirable to insulate the conduit from the compressor.

It is the primary object of this invention to provide a novel, simple construction of electrical insulator which may be used to join or couple together the ends of adjacent conduit sections and which may be used to connect a conduit to a machine, such as a compressor, which couplings are so constructed as to withstand high pressures of fluids passing therethrough, and at the same time to effectively insulate the two parts coupled thereby from electrical charges.

Other objects will be apparent from the following specification.

In the drawing:

Fig. 3 is a sectional view taken on line 3—3 of Fig. 4 and illustrating another type of coupling; and Fig. 4 is an end view of the coupling shown in Fig. 3.

Figure 1:
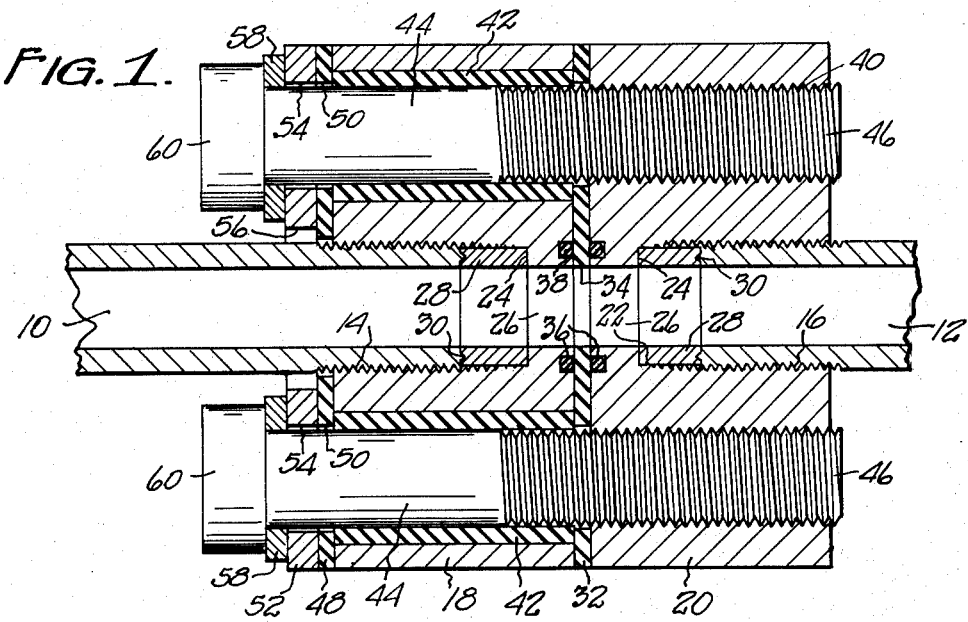
Fig. 1 is a sectional view of one form of coupling taken on line 1—1 of Fig. 2.
Figure 2:
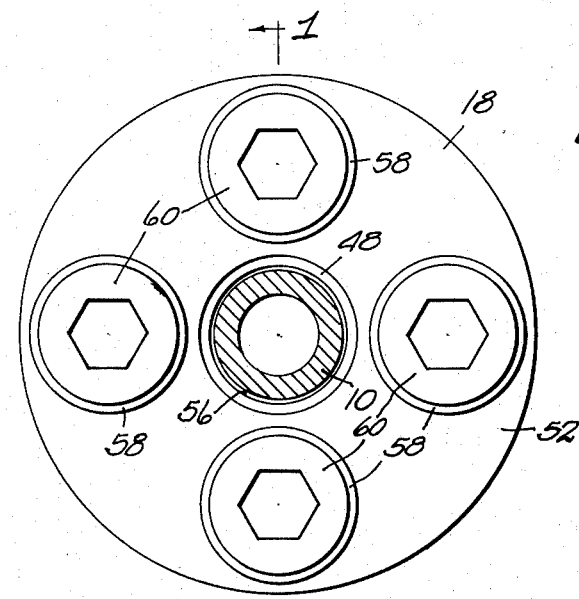
Fig. 2 is an end view of the coupling illustrated in Fig. 1.

Referring to the embodiment of the invention illustrated in Figs. 1 and 2, which is adapted and intended primarily for use in connecting together two adjacent sections of a conduit, the numerals 10 and 12 designate the conduits which are to be connected. These conduits commonly will be units having thick wall sections and will be formed either of steel or of copper and will be of such character as to withstand application of high fluid pressures, such as pressures in the range from 5,000 to 15,000 pounds per square inch. The conduits 10 and 12 are screw-threaded at the end portions 14 and 16, respectively, thereof and each is threaded into a screw-threaded bore of a coupling member. Thus conduit 12 is threaded into a bore in the coupling member 18, and conduit 12 is threaded into a bore in the coupling member 20. The coupling or connector members 18 and 20 preferably constitute strong thick blocks of steel or other electrical conductive material.

The bores of the connector members 18 and 20 which receive conduits 10 and 12 are preferably provided with inner portions 22 extending inwardly beyond the threaded portions thereof and terminating at shoulders 24 formed between the inner bore portion and a reduced bore portion 26 whose diameter is preferably equal to the diameter of the bore of the conduits 10 and 12. An annular member 28, having inner and outer diameters substantially the same as the conduits 10 and 12 and which is formed of a metal, such as bronze, is positioned in the inner portion 22 of the bore to be firmly abutted by the end of the conduit so as to effect a seal therewith. In order to effect this seal, the end of the conduit may be provided with a concentric annular knife edge 30 adapted to bite into the annular member 28. Also, the outer diameter of the conduit 28 may be equal to or slightly less than the diameter of the portion 22 so as to provide a snug fit of the member 28 at said shoulder. It will be understood that the conduit will be threaded into firm abutment with the sleeve 28 so that an effective sealing face engagement between the various parts 30 will be provided at the joint, and leakage of air at and around the conduit 10 will be either completely avoided or reduced to a negligible amount. In this connection the long threaded connection between the conduit and the coupling body further assists in avoiding leakage and may be enhanced by coating materials applied at the threaded connection.

A dielectric plate 32 is interposed between the connector members 18 and 20, the same being of uniform thickness throughout if the inner faces of members 18 and 20 are flat and parallel as shown, and having full face engagement with the connector members at the inner faces thereof. The dielectric plate 32 has a central bore 34 therein of the same size as, and located in register with, the reduced bore portions 26 of the connector parts 18 and 20. The dielectric plate 32 may be formed of any material which has dielectric properties and sufficient strength to withstand the high pressures used in the system. I have found that phenolic type thermosetting resins having paper, rag or asbestos fiber reinforcement are well suited for formation of the member 32, because of their strength and toughness, good machining quality and resistance to attack by acids, oils or solvents.

The two connector parts 18 and 20 each have an annular groove 36 formed in the inner face thereof encircling and substantially concentric with the reduced bore portions 26. Each of these grooves 36 receives an annular resilient sealing ring of the character commonly known as an O-ring, whose cross-sectional diameter is preferably slightly greater than the depth of the groove 36 so as to insure contact thereof continuously with the face of the plate 32 confronting the groove 36 when the parts are assembled as shown in Fig. 1 with the members 18 and 20 pressing flat against the opposite surfaces of the plate 32. These O-rings 38 serve to seal the joint between each of the members 18, 20 and the plate 32 and thus insure against leakage from the coupling at said plate 32.

Each of the connector body members 18 and 20 has a plurality of passages extending therethrough parallel to the central bore thereof, the same being preferably equally spaced from said central bore and also equally spaced from each other. Thus as illustrated in Fig. 2, four such bores are formed in the members 18 and 20. The bore in the member 18 is smooth and is of a larger size than the screw-threaded bore 40 in the member 20, as shown. Thus the bore in the member 18 receives a sleeve 42 of dielectric material which is preferably of a length to extend completely through said bore with its inner end abutting against the plastic plate 32. A securing member passes through the bores to secure members 18 and 20 together, and may be a cap screw having a shank 44 fitting in each tube 42 and having a screw-threaded shank portion 46 which is screw-threaded in the threaded bore 40 of the connector member 20. The tube 42 will preferably be formed from fiber material or from fiber-reinforced thermosetting plastic material, such as plastic of phenolic type.

A dielectric plate 48 bears against the outer end surface of the connector body member 18 and may bear against the outer end of the fiber tube 42. The plate 48 has apertures at 50 adapted to receive the shanks 44 of the cap screws and has a central aperture in register with the central conduit-receiving bore of the connector member 18 so as to receive the conduit 10 therethrough. A metal plate 52 bears against the outer surface of the plate 48. The plate 52 has apertures 54 therein which register with and receive the shanks 44 of the cap screw. The plate 52 also has a central aperture 56 which is of a diameter substantially larger than the diameter of the conduit 10 and receives that conduit with clearance. Lock washers 58 bear against the outer surface of the plate 52 and underlie the heads 60 of the cap screws.

When the device is assembled and constructed in the manner illustrated in Fig. 1, the cap screws draw the connector body parts 18 and 20 firmly together in face contact with the intermediate dielectric member 32 in such a manner as to insure an effective fluid seal between the parts 18, 20 and 32 at the O-rings or annular sealing members 38. The two connector members 18 and 20 are completely insulated from each other electrically. In this connection it will be observed that the shank of each cap screw has metal-to-metal or threaded contact with the member 20, but it is completely insulated from the member 18 by the parts 32, 42 and 48. At the same time the construction is such that the stresses which are required to hold the parts together against the forces acting to separate them, namely the high fluid pressure in the bore, are completely sustained despite the absence of a metal-to-metal connection between any of the bolts and the connector part 18. Another advantage of this construction is the fact that the individual parts are simple in construction and can be assembled and fitted together easily and quickly so that the device is not costly from the standpoint of initial purchase or from the standpoint of its application.

Another important feature of the invention is the simplicity of its connection with the conduit by reason of the fact that the conduits are simply threaded therein and yet an effective seal to withstand high pressure is secured. It may be mentioned in this connection that, while the use of bronze for the sealing ring or sleeve 28 is preferred, any other material, such as a reinforced plastic material, may be employed in place of bronze.

Still another important advantage of this device is the fact that it is rugged and sturdy in use and well suited for location in mines and like places where rough usage incident to the blasting of coal can be expected.

The embodiment of the invention illustrated in Figs. 3 and 4 is particularly well suited for use in connecting a pair of copper conduits in a high pressure line or in connecting one such conduit with the frame of a machine, such as a compressor. The Fig. 3 device entails the use of a steel base plate 70 of substantial thickness having superimposed thereon a dielectric plate 72 of substantially uniform thickness and of a size at least as large as, and preferably larger than, a steel body block member 74 and having a plurality of equispaced bores therethrough which receive dielectric tubes 76. A second dielectric plate 78 bears upon the end of the body 74 opposite the end which engages the dielectric plate 72, and this dielectric plate 78 has apertures therein which register with the bore of the tube 76 and with apertures in the plate 72 and with a screw-threaded bore 80 in the block or base plate 70. A metal plate member 82 bears against the outer surface of the dielectric plate 78 and has apertures registering with the apertures last mentioned and cooperating therewith to receive the shanks 84 of cap screws whose screw-threaded portions 86 are locked in the screw-threaded bores 80 in the plate 70. Lock washer 88 underlies the head 90 of each cap screw. The arrangement is such that the use of the cap screws enables the parts to be drawn firmly and effectively together with complete insulation electrically between the parts 70 and 74 and also between the parts 74 and the bolt or screw parts 84 and 90.

The metal plate 82 has a central aperture 92, and the insulator plate 78 has a central aperture 94. Tapered screw-threaded bore 96 is formed in the metal member 74 concentric with the apertures 92 and 94 and of smaller size and the same is adapted to receive a tapered screw-threaded neck portion 98 of a connector member having an outer portion 100 which extends through the apertures 92 and 94 with clearance and which has in turn a tapered internally screw-threaded socket 102 adapted to receive the tapered screw-threaded neck 104 of a second tubular fitting 106. The two fittings 100 and 106 cooperate to mount a copper tube 130 through the use of a tubular fitting 132. It will be observed that the bore 108 of the part 106 is concentric with and communicates with the bore 110 of the part 100. The tapered bore 96 in the member 74 terminates at a shoulder 112 separating the same from a reduced bore portion 114. The plate 72 has a bore 116 registering with the reduced bore portion 114, and similarly the plate 70 has a tapered fitting-receiving bore 118 terminating in a reduced bore portion 120 communicating with the bore 116 in the plate 72. A tube-receiving fitting is adapted to be mounted in the tapered socket 118 in the manner explained above.

The parts 70 and 74 are provided with annular grooves in the faces thereof engaging the plate 72, which grooves encircle the bore portions 114 and 120, respectively, and are adapted to receive annular resilient sealing members 122 and 124, respectively.

It will be observed that this construction of the device provides a fully insulated connection between separate parts of a connector which are ruggedly and strongly connected to resist separation and to withstand the high pressures in the fluid line. At the same time fluid leaks are avoided and the coupling possesses a strength at least equal to the strength possessed by the ordinary union or coupling between conduit sections.

While the device is intended primarily for and finds great utility when used in high pressure fluid lines, it will be understood that the device may be used in lines operating at low pressures.

While the preferred embodiments of the invention have been illustrated herein, it will be understood that changes in the construction may be made within the scope of the appended claims without departing from the spirit of the invention.

I claim:

1. An insulated coupling for fluid lines adapted to be charged with gas pressure in excess of 1000 pounds per square inch comprising a pair of metal members each having a plurality of outer bores therethrough and a substantially central bore having a screw-threaded outer portion and a reduced inner portion, tubular means mounted in the outer bore portions of said central bore for leak-proof end abutment with a conduit, said bores registering with each other, a strong pressure-resistant plate-like dielectric member substantially coextensive with said metal members interposed between and adapted for face engagement with said metal members and having apertures communicating with said bores, said metal members having annular grooves in the faces thereof which engage said dielectric member, said grooves being spaced from and encircling said central bores, annular resilient sealing members seated in said grooves and each having sealing engagement with one metal member and said dielectric member, securing members in said outer bores for drawing said metal members toward each other into firm engagement with said dielectric member, and dielectric means carried by one metal member to electrically insulate the same from said securing members.

2. An insulated coupling for fluid lines adapted to be charged to pressures exceeding 1000 pounds per square inch comprising a pair of metal members each having a plurality of outer bores and a substantially central bore therethrough said central bore including a screw-threaded outer portion, an intermediate portion and a reduced inner portion separated from said intermediate portion by an annular shoulder, a metal sleeve fitting in said intermediate portion, a conduit formed of a metal harder than said sleeve and threaded in said outer bore portion and pressing said sleeve into sealing end abutment therewith and with said shoulder, said bores registering with each other, a preformed, rigid, substantially fluid-impervious dielectric member of substantially uniform thickness interposed between and adapted for face engagement with said metal members and having apertures communicating with said bores, said metal members having annular grooves in the faces thereof which engage said dielectric member, said grooves being spaced from and encircling said central bores, annular resilient sealing members seated in said grooves and each having sealing engagement with a metal member and said dielectric member, securing members in said outer bores for drawing said metal members toward each other into firm engagement with said dielectric member, and dielectric means carried by one metal member to electrically insulate the same from said securing members.

3. An insulated coupling for pressure charged fluid lines as defined in claim 2, wherein each conduit has a concentric annular knife edge projection at its inner end adapted to penetrate the end of the adjacent sleeve.

4. An insulated coupling for pressure charged fluid lines as defined in claim 1, wherein said last named dielectric means consist of dielectric tubes encircling said securing members and a laminar end member including a dielectric lamination interposed between a pressure plate and the outer surface of said one metal member, said pressure plate having an aperture larger than said line to receive the same with clearance.

References Cited in the file of this patent

UNITED STATES PATENTS

| | | |
|---|---|---|
| 420,391 | Rice | Jan. 28, 1890 |
| 501,021 | McCarthy | July 4, 1893 |
| 552,363 | Gleason | Dec. 31, 1895 |
| 737,125 | Moreau | Aug. 26, 1903 |
| 764,603 | Lambert | July 12, 1904 |
| 854,936 | Dresser | May 28, 1907 |
| 1,834,581 | Ferrell et al. | Dec. 1, 1931 |
| 1,858,251 | Spicer | May 17, 1932 |
| 2,626,166 | Fawick | Jan. 20, 1953 |
| 2,627,580 | Picard | Feb. 3, 1953 |
| 2,676,037 | Mueller | Apr. 20, 1954 |
| 2,752,579 | Caldwell | June 26, 1956 |